(12) United States Patent
Ohta et al.

(10) Patent No.: US 7,024,076 B2
(45) Date of Patent: Apr. 4, 2006

(54) OPTICAL PACKET HEADER IDENTIFIER, OPTICAL ROUTER INCORPORATING THE SAME THEREIN, AND OPTICAL ROUTING METHOD USING THE ROUTER

(75) Inventors: Yoshinori Ohta, Tokyo (JP); Yukio Ogura, Tokyo (JP)

(73) Assignee: Laserfront Technologies, Inc., Kanagawa (JP)

( * ) Notice: Subject to any disclaimer, the term of this patent is extended or adjusted under 35 U.S.C. 154(b) by 0 days.

(21) Appl. No.: 11/083,981

(22) Filed: Mar. 21, 2005

(65) Prior Publication Data

US 2005/0163427 A1    Jul. 28, 2005

Related U.S. Application Data

(62) Division of application No. 10/370,462, filed on Feb. 24, 2003, now Pat. No. 6,892,001.

(30) Foreign Application Priority Data

Feb. 26, 2002  (JP) ............................. 2002-049646

(51) Int. Cl.
*G02B 6/34* (2006.01)
(52) U.S. Cl. .................... 385/37; 359/558; 359/566
(58) Field of Classification Search ............... 385/37; 359/558, 566
See application file for complete search history.

(56) References Cited

U.S. PATENT DOCUMENTS

| 5,631,885 | A | * | 5/1997 | Brazas, Jr. ............... 369/44.23 |
| 5,745,617 | A | * | 4/1998 | Starodubov et al. .......... 385/37 |
| 5,881,188 | A | * | 3/1999 | Starodubov .................. 385/37 |
| 6,553,162 | B1 | * | 4/2003 | Okayama .................... 385/37 |

FOREIGN PATENT DOCUMENTS

JP    2001-177565    6/2001

\* cited by examiner

*Primary Examiner*—John R. Lee
*Assistant Examiner*—Paul M. Gurzo
(74) *Attorney, Agent, or Firm*—Young & Thompson

(57) ABSTRACT

An optical packet header identifier having a simplified configuration and being superior in reliability, stability, and economical efficiency, an optical router incorporating the identifier therein, and a routing method using the optical router are provided. The optical packet header identifier includes an optical waveguide, optical focusing elements, and a photo receiver. Tilted gratings for diffracting an incident optical beam and emitting the beams as diffracted optical beams to the outside of the waveguide are formed within the optical waveguide. The tilted gratings are not formed uniformly in a longitudinal direction of a core of the optical waveguide, but are arranged at intervals. The length of a portion containing a set of gratings and the length of a portion containing no gratings can be defined in increments of length "L". "L" equals to the spatial length which 1 bit in an optical signal occupies.

5 Claims, 12 Drawing Sheets

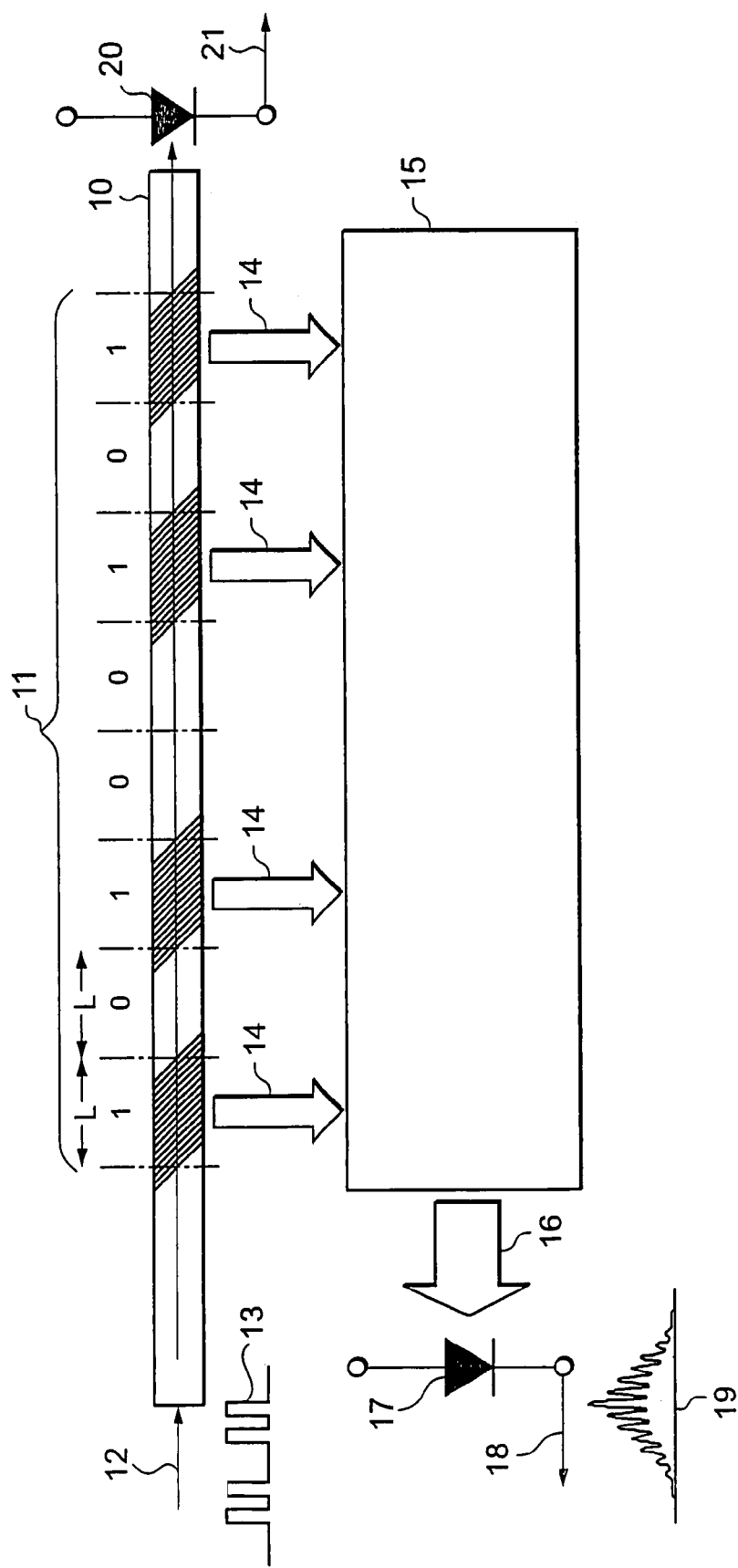

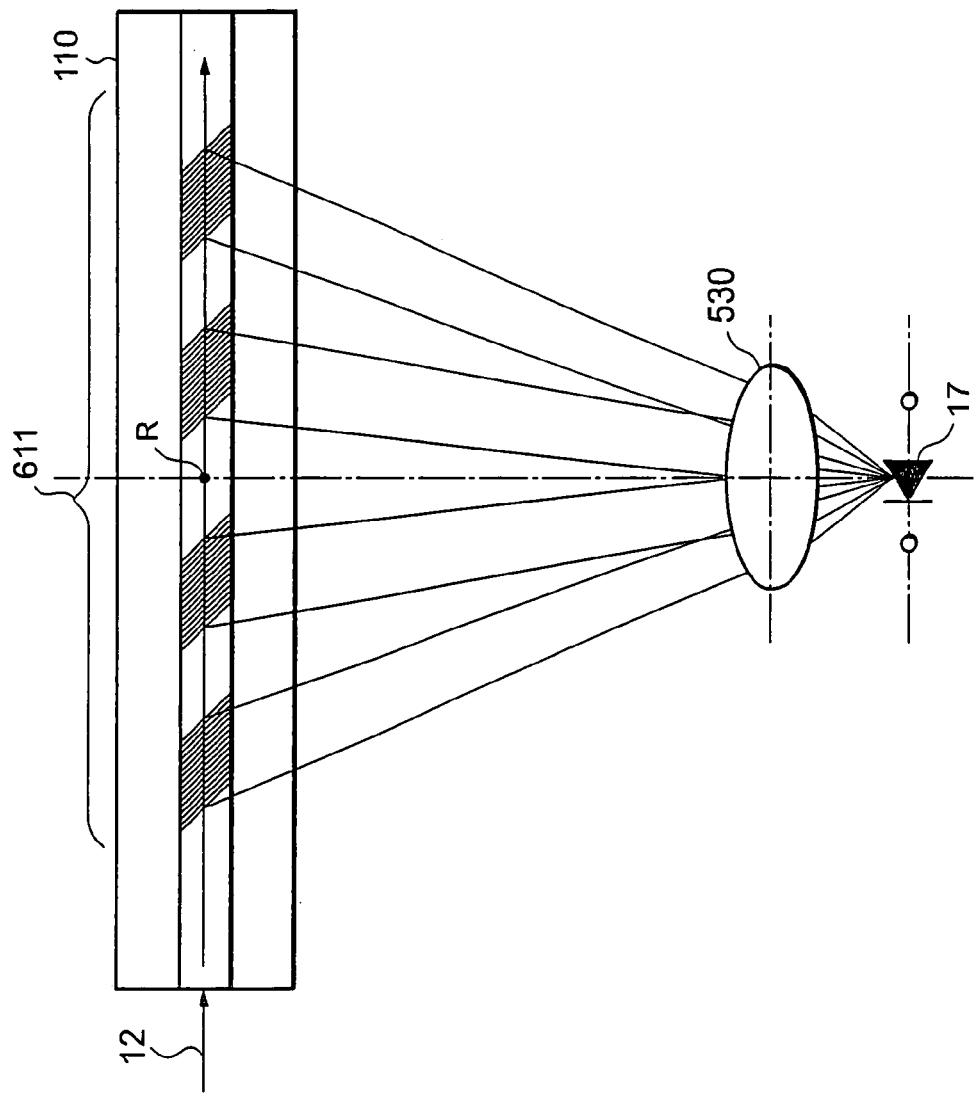

OPTICAL PACKET HEADER IDENTIFIER, OPTICAL ROUTER INCORPORATING THE SAME THEREIN, AND OPTICAL ROUTING METHOD USING THE ROUTER

This application is a division of co-pending application Ser. No. 10/370,462, filed on Feb. 24, 2003 now U.S. Pat. No. 6,892,001, which claims benefit of Japanese Application No. 2002-049646, filed on Feb. 26, 2002, the entire contents of which are hereby incorporated by reference.

BACKGROUND OF THE INVENTION

1. Field of the Invention

The present invention relates to an optical packet header identifier for verifying whether or not an optical address code added to an optical packet signal transmitted from outside coincides with an address code previously given to an optical packet receiver without photoelectric conversion while maintaining the added code in the form of light and for outputting a result of the coincidence of codes as an electrical signal output in the event the two codes coincide with one another, an optical router incorporating the identifier therein, and an optical routing method using the optical router.

2. Description of the Related Prior Art

Advent of the Internet community has been drastically increasing communication traffic. Therefore, there is a demand for realization of a network that is able to accept the increase in communication traffic, have a high-capacity, operate at higher rate, and have at lower communication cost. Optical fiber communication technology is very the one that meets such requirements.

When focusing attention on the field of communication protocol, a connectionless communication typified by Internet Protocol (IP) is becoming increasingly dominant over a circuit switching connection typified by a telephone network. To achieve a high-capacity and high-speed communication system of the type used for connectionless communication, it is desirable to be able to perform optical signal transmission throughout from a transmitting terminal to a receiving terminal without any photoelectric conversion.

Routing is a technique for selecting an optimal path to be used from a plurality of communication paths in order to transmit an IP packet to a final destination. In an optical communication system, a wavelength routing system that employs a wavelength as address information to determine the destination of signal light has been known as a routing technique that uses an optical signal as it is. However, this routing technique can be applied only to a high-speed/capacity portion of communication network because a wavelength resource, i. e., the number of wavelengths to be allocated to individual addresses is limited. Currently, it is difficult to deliver an IP packet to an access path that needs a number of addresses while maintaining the packet in the form of light.

A technique using an optically encoding/decoding device for encoding a light signal, and in turn, decoding the encoded light signal is disclosed in Japanese Patent Application Laid-open No. 2001-177565.

FIG. 1 is the exemplary configuration of an optical encoder (note that the optical encoder can be used not only for encoding a light signal but for decoding the same) composed of 8-tip optical bipolar encoder of the type used in PLC (Planar Lightwave Circuit) in the above-described patent. A light pulse input to the optical encoder is branched into eight tip pulses that are made to have a time delay of 5 ps between adjacent pulses and equal intensity by operating a tunable optical tap 41 and an optical delay line 42. Each of the branched tip pulses is processed such that a phase shift "0" or "$\pi$" due to a thermal-optical effect by an optical phase shifter 43 is given to the optical phase of the tip pulse, and then encoded by again combining the tip pulses together through a combiner 44. The given combination of phase shifts thus corresponds to one code. Each of the optical phase shifters 43 is controlled in response to an address code, thereby producing a desired optical bipolar code. In turn, when the optical bipolar code is input to the same optical encoder, a correlation between the optical code input thereto and the combination of phase shifts of the optical phase shifter is detected. A correlation signal having high intensity is output only when the optical code input thereto and the combination of phase shifts of the optical phase shifter coincide with one another, whereby the code is identified.

In the above-described optical encoder employed in the disclosed technique, since encoding or decoding is performed by giving a phase shift "0" or "$\pi$" to an electric field of light, the encoding or decoding is so sensitive to change in optical frequency. Furthermore, the optical encoder is not practical for use because it has no compatibility with the current optical fiber communication system in which data or address is transmitted/received by modulating the intensity of light.

SUMMARY OF THE INVENTION

The present invention has been made in view of the above-described problems, and an object of the present invention is therefore to provide: an optical packet header identifier, without calculation of correlation in an electronic circuit, having a low power consumption, operating at higher rate, having a simplified configuration, and having a superiority in reliability, stability and economical efficiency; an optical router incorporating the identifier therein; and a routing method using the router.

An optical packet header identifier according to the first aspect of the present invention comprises: an optical waveguide, a tilted grating for diffracting an optical beam propagating within a core of the optical waveguide toward the outside of the optical waveguide; and a set of tilted gratings constituted by the tilted grating and having a thickness of gratings approximately equal to the length occupied in a direction along an optical axis within the optical waveguide by 1-bit in a signal of an optical packet, the plurality of sets of tilted gratings being encoded and arranged in a direction along an optical axis based on a specific header code of the optical packet; optical beam focusing means for spatially focusing optical beams diffracted by all of the sets of tilted gratings; a first photo receiver for receiving the focused optical beams; and a second photo receiver for receiving an optical beam propagating though the optical waveguide at an output end of the optical waveguide.

The identifier is further constructed such that the optical waveguide is any one of an optical fiber and a channel waveguide formed on a planar substrate.

The identifier is further constructed such that the optical beam focusing means is a slab waveguide provided to guide the diffracted optical beams and having a parabolic reflecting end face for reflecting the guided optical beams, and the first photo receiver is provided at a focal point of the slab waveguide.

The identifier is further constructed such that the optical beam focusing means comprises a second optical fiber for diffracting the diffracted optical beams to make the optical beams travel in cladding mode by using tilted gratings formed in a core portion of the second optical fiber, and the first photo receiver is provided at an end face of the second optical fiber to receive the optical beams traveling in cladding mode within the second optical fiber.

The identifier is further constructed such that the optical beam focusing means further comprises a third optical fiber which is located between the optical waveguide and the second optical fiber, and focuses the diffracted optical beams from the optical waveguide onto a center of the second optical fiber.

The identifier is further constructed such that the optical waveguide is provided on a front side of the third optical fiber and positioned apart a distance two times a focal length of the third optical fiber for focusing, from the third optical fiber, and the second optical fiber is provided on a rear side of the third optical fiber and positioned apart a distance two times a focal length of the third optical fiber from the third optical fiber.

The identifier further comprises a fourth optical fiber in addition to the third optical fiber, in which a center of the optical waveguide is positioned at a front focal point of the third optical fiber and a center of the second optical fiber is positioned at a rear focal point of the fourth optical fiber, and the third and fourth optical fibers focus diffracted optical beams from the optical waveguide onto the second optical fiber.

The identifier is further constructed such that the optical beam focusing means is a "fθ" lens provided so that a central axis of the core of the optical waveguide and a light receiving face of the first photo receiver have relationship represented by "fθ", and a tilt angle of each of the plurality of sets of tilted gratings is determined so that a diffraction direction associated with diffracted optical beams from each of the plurality of sets of tilted gratings satisfies relationship represented by "fθ".

The identifier is further constructed such that the optical waveguide is provided to form a circle in a plane, the plane having the tilted grating tilted therein, and the optical beam focusing means comprises: an optical fiber acting as a cylindrical lens and provided so that the optical fiber forms another circle around the same center as that of the circle in the same plane as that for the optical waveguide to form the circle, and a center of the core of the optical waveguide is positioned at a front focal point of the optical fiber; and a lens for focusing diffracted images, transmitted from the optical fiber and formed in the center of the circle, onto the first photo receiver.

The identifier is further constructed such that light-diffracting efficiency of each of the plurality of sets of tilted gratings is determined so that intensity of diffracted optical beams from all of the plurality of sets of tilted gratings becomes uniform.

The optical packet header identifier according to the first aspect of the present invention is further characterized in that the optical waveguide is a semiconductor optical waveguide, the tilted grating has a spatial periodic refractive index variation generated in the core by a band-filling effect, the effect being caused when carriers are injected into the semiconductor optical waveguide, and the set of tilted gratings is formed by conducting current between grid-shaped electrodes which is provided on a cladding of the semiconductor optical waveguide and which is electrically connected to each other and an electrode which is provided to face the grid-shaped electrodes via the semiconductor optical waveguide in order to inject carriers into the semiconductor optical waveguide.

The identifier is further constructed such that the encoding of the plurality of sets of tilted gratings is determined depending on whether or not current is conducted to a plurality of the grid-shaped electrodes provided along an optical axis.

The identifier is further constructed such that the optical beam focusing means is a slab waveguide provided to guide the diffracted optical beams and having a parabolic reflecting end face for reflecting the guided optical beams, and the first photo receiver is provided at a focal point of the slab waveguide.

The identifier is further constructed such that the optical beam focusing means comprises a second optical fiber for diffracting the diffracted optical beams to make the optical beams travel in cladding mode by using tilted gratings formed in a core portion of the second optical fiber, and the first photo receiver is provided at an end face of the second optical fiber to receive the optical beams traveling in cladding mode within the second optical fiber.

The identifier is further constructed such that the optical beam focusing means further comprises a third optical fiber, located between the optical waveguide and the second optical fiber, for focusing the diffracted optical beams from the optical waveguide onto a center of the second optical fiber.

The identifier is further constructed such that the optical waveguide is provided on a front side of the third optical fiber and positioned apart a distance two times a focal length of the third optical fiber for focusing, from the third optical fiber, and the second optical fiber is provided on a rear side of the third optical fiber and positioned apart a distance two times a focal length of the third optical fiber from the third optical fiber.

The identifier further comprises a fourth optical fiber in addition to the third optical fiber, in which a center of the optical waveguide is positioned at a front focal point of the third optical fiber, a center of the second optical fiber is positioned at a rear focal point of the fourth optical fiber, and the third and fourth optical fibers focus diffracted optical beams from the optical waveguide onto the second optical fiber.

The identifier is further constructed such that the optical beam focusing means is a "fθ" lens provided so that a central axis of the core of the optical waveguide and a light receiving face of the first photo receiver have relationship represented by "fθ", and a tilt angle of each of the plurality of sets of tilted gratings is determined so that a diffraction direction associated with diffracted optical beams from each of the plurality of sets of tilted gratings satisfies relationship represented by "fθ".

The identifier is further constructed such that light-diffracting efficiency of each of the plurality of sets of tilted gratings is determined so that intensity of diffracted optical beams from all of the plurality of sets of tilted gratings becomes uniform by controlling current supplied to each of the plurality of grid-shaped electrodes.

An optical router according to the second aspect of the present invention is for switching between paths for a specific optical packet out of an optical signal consisting of an optical packet train having a plurality of optical packets coupled together, and the optical router comprises: an optical branch for branching the optical packet train input from an optical transmission input line; the optical packet header identifier defined in the first aspect of the present invention for receiving one of optical outputs from the optical branch; an optical delay device for making the other of optical outputs from the optical branch delay by a predetermined time delay; an optical switch for outputting at least one optical packet having a header identified by the optical packet header identifier, the optical packet being separated from the optical packet train output from the optical delay device, to a first optical transmission output line, and outputting optical packets excluding the at least one optical packet identified by the optical packet header identifier to a second optical transmission output line, based on an output from the optical packet header identifier.

An optical router according to the third aspect of the present invention comprises a demultiplexer for demultiplexing the wavelength-division-multiplexed optical signal input from an optical transmission input line; a plurality of the optical routers defined in the second aspect of the present invention for receiving a plurality of optical outputs having wavelengths different from one another from the demultiplexer, respectively; and a multiplexer for multiplexing discrete wavelength optical outputs from the second optical transmission line of the plurality of the optical routers defined in the second aspect of the present invention.

An optical router according to the fourth aspect of the present invention is an optical router having function of Optical Add/Drop Multiplexer (Optical ADM) for switching between paths for a specific optical packet out of a plurality of optical packets coupled together and constituting an optical packet train as an optical signal and, for inserting an optical packet different from the specific optical packet into a location of the specific optical packet, the location becoming empty by switching between paths, and the optical router comprises: an optical branch for branching the optical packet train input from a first optical transmission input line; an optical packet header identifier for receiving one of optical outputs from the optical branch; an optical delay device for making the other of optical outputs from the optical branch delay by a predetermined time delay; and an optical switch for outputting at least one optical packet having a header identified by the optical packet header identifier, the optical packet being separated from the optical packet train output from the optical delay device, to a first optical transmission output line, outputting optical packets excluding the at least one optical packet identified by the optical packet header identifier to a second optical transmission output line, and inserting an optical packet from a second optical transmission input line into a location of the at least one optical packet identified by the optical packet header identifier, based on an output from the optical packet header identifier.

An optical router according to the fifth aspect of the present invention is an optical router having function of Optical Add/Drop Multiplexer (Optical ADM) for switching between paths for a specific optical packet out of a plurality of optical packets coupled together and constituting an optical packet train, and inserting an optical packet different from the specific optical packet into a location of the specific optical packet, the location becoming empty by switching between paths, and the optical router comprises: a demultiplexer for demultiplexing the wavelength-division-multiplexed optical signal input from the first optical transmission input line; a plurality of the optical routers defined in the fourth aspect of the present invention for receiving a plurality of optical outputs having wavelengths different from one another from the demultiplexer, respectively; and a multiplexer for multiplexing discrete wavelength optical outputs from the plurality of the optical routers defined in the fourth aspect of the present invention into a wavelength division multiplexed optical signal and outputting the multiplexed optical signal to the second optical transmission output line.

An optical routing method, according to the sixth aspect of the present invention, using the optical router defined in the fifth aspect of the present invention, comprises steps of: detecting a head of the optical packet train based on an output from the second photo receiver of the optical packet header identifier; calculating, in the time domain, locations of headers of optical packets constituting an optical packet train based on the time when the head of the optical packet train is detected; detecting an output from the first photo receiver of the optical packet header identifier at individual times corresponding to the locations; and making a corresponding optical packet delay by a time period in order to separate the corresponding optical packet from the optical packet train input to the optical router, the time period being equal to a time delay by which the optical packet train is made to delay by the optical delay circuit to transmit to the optical switch a control signal so that the optical switch changes its switch state for a duration of the corresponding optical packet, in the event the detected output from the first photo receiver is higher than a predetermined level.

The optical packet header identifier of the present invention comprises: an optical waveguide configured to have a plurality of sets of tilted gratings, the locations of which are previously encoded in a direction along an optical axis, arranged along the waveguide; light-focusing means; and a photo receiver. Accordingly, the optical packet header identifier having no necessity for calculation of correlation between codes performed by an electronic circuit and a low power consumption, operating at high rate, a superior reliability, stability and economical efficiency can be achieved.

Furthermore, the optical packet header identifier of the present invention can be configured to be programmable as follows. That is, the optical waveguide comprises a semiconductor optical waveguide, the plurality of sets of tilted gratings are realized such that a plurality of sets of grid-shaped electrodes are formed on the semiconductor optical waveguide and at least one of the plurality of sets of grid-shaped electrodes is previously selected in response to a code to be identified, and then is supplied with current to produce at least one set of tilted gratings within the semiconductor optical waveguide by utilizing a band-filling effect.

Moreover, the optical packet header identifier makes it possible to construct an optical ADM and an optical router each incorporating the identifier therein and having a simplified configuration.

BRIEF DESCRIPTION OF THE DRAWINGS

The above and other objects, features and advantage of the present invention will become apparent from the following detailed description when taken with the accompanying drawings in which:

FIG. 2 is a diagram illustrating the configuration of a first embodiment of an optical packet header identifier according to the present invention;

FIG. 3 is a diagram illustrating the configuration of a first example of the first embodiment of the optical packet header identifier according to the present invention and FIG. 3A is a plan view of the first example of the first embodiment.

FIG. 4 is a diagram illustrating the configuration of a second example of the first embodiment of the optical packet header identifier according to the present invention and FIG. 4A is a plan view of the first example of the first embodiment.

FIG. 7 is a diagram illustrating the configuration of a fifth example of the first embodiment of the optical packet header identifier according to the present invention and FIG. 7A is a plan view of the first example of the first embodiment.

FIG. 8 is a diagram illustrating the configuration of a sixth example of the first embodiment of the optical packet header identifier according to the present invention and FIG. 8A is a plan view of the first example of the first embodiment, and FIG. 8B is a side view thereof;

DETAILED DESCRIPTION OF THE PREFERRED EMBODIMENTS

Figure 1:
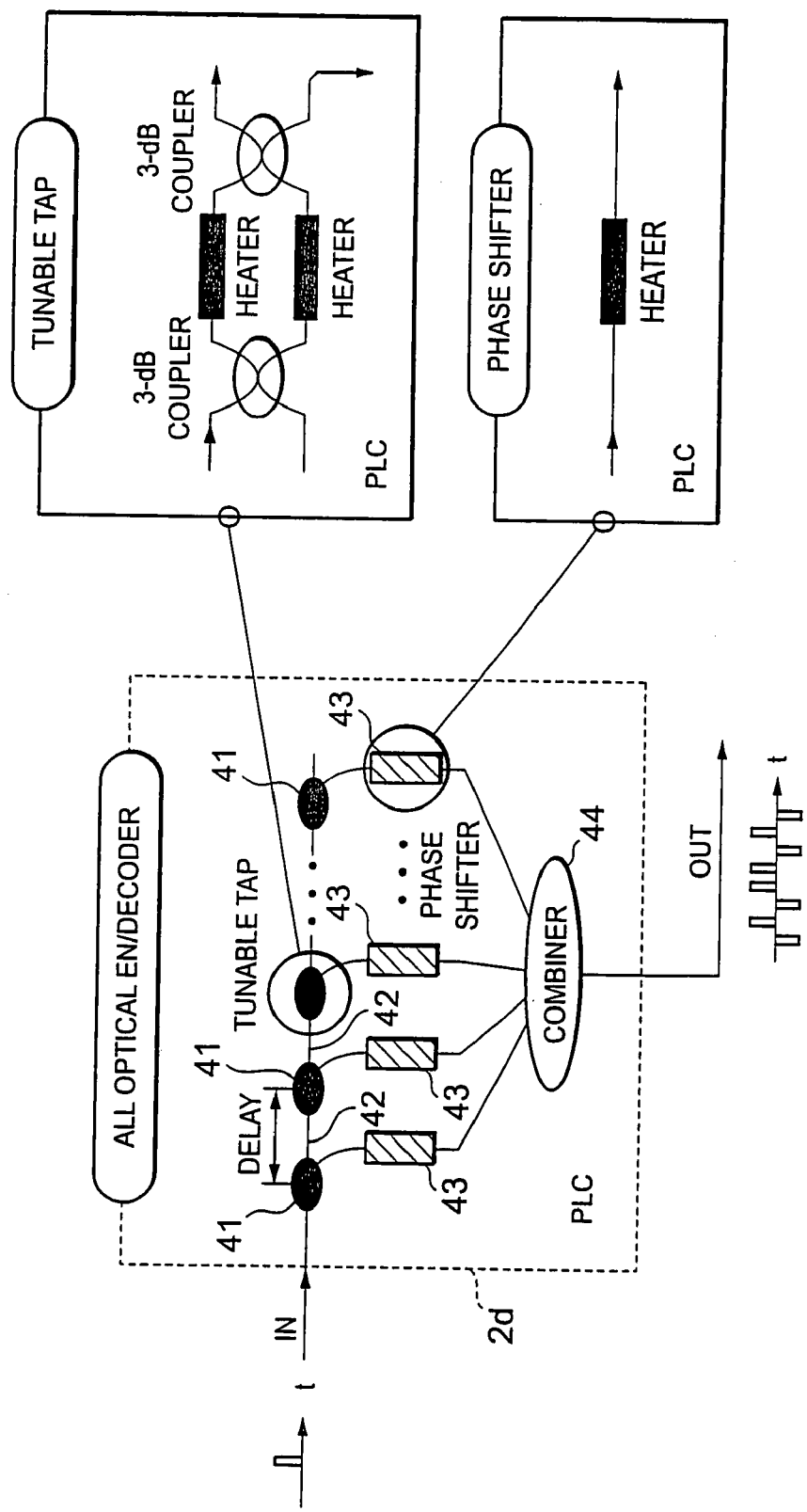
FIG. 1 is a diagram illustrating the configuration of a conventional optical packet header identifier.

FIG. 2 is a diagram illustrating the general configuration of an optical packet header identifier according to the present invention. The optical packet header identifier comprises an optical waveguide 10, optical focusing means 15, and photo receivers 17 and 20, and tilted gratings 11 for diffracting an incident optical beam 12 to emit the beam as an emitted optical beam 14 to the outside of the waveguide is formed within the optical waveguide 10. The tilted gratings are not formed uniformly along the optical waveguide 10, but are constructed such that a plurality of sets of tilted gratings are arranged at intervals. The length of a portion containing a set of tilted gratings and the length of a portion containing no gratings, can be defined in increments of length "L." "L" equals to the length that 1-bit in a digital optical signal 12 occupies within the waveguide 10. Arrangement of the plurality of sets of tilted gratings along an optical axis coincides with a previously given address code. As shown in FIG. 2, an 8-bit code including the binary sequence "10100101" is provided within the waveguide. The optical signal 12 input to the waveguide travels within the waveguide 10 and at the moment when arrangement of the code of the optical signal and arrangement of the plurality of sets of tilted gratings spatially coincide with one another, the optical beam guided within the waveguide is diffracted to the outside of the waveguide, while having its maximum intensity. The optical focusing means 15 performs the spatial integration of the emitted optical beams 14, which are emitted to the outside of the waveguide by the plurality of sets of tilted gratings, and then the optical beams 14 are output as a focused optical beam 16 to the photo receiver 17. When the photo receiver 17 is made to have a bandwidth so that the receiver serves as a low-pass filter for making the frequency of a clock signal input thereto approximately be the cut-off frequency thereof, the photo receiver 17 performs the integration of the focused optical beams 16 for a time period, and converts the beam to an electrical signal, and then outputs an electrical output signal 18.

The optical packet header identifier outputs a correlation calculation result 19 as an electrical signal by correlating an optical signal 13 input to the waveguide and encoded through intensity modulation with the pattern of the plurality of sets of tilted gratings that are previously arranged. As shown in FIG. 2, when arrangement of the optical signal 13 input to the waveguide and the pattern 11 of the plurality of sets of tilted gratings coincide with one another, a correlation signal 19 having a high peak value is output, and when those two components, i.e., arrangement and pattern, do not coincide with one another, a peak does not appear in the signal 19 because of low correlation between them. The above-described operation makes it possible to detect the address code added to the optical signal. The photo receiver 20 receives an optical packet train transmitting through the optical waveguide 10. A photoelectrically converted signal 21 output from the waveguide is used for producing a timing signal indicative of locations in headers of individual packets that constitute the optical packet train to introduce the correlation signal 19, and is used for producing a timing signal to separate the optical packets, all of which have the address added thereto.

Assuming that the waveguide is a quartz waveguide containing Ge and has a refractive index of 1.45, and the wavelength of optical signal is 1.55 μm, and further a bit rate is 40 Gbps, the length "L" along the waveguide, which length corresponds to 1-bit in an optical signal, is 2.6 mm, and the length that corresponds to 8-bit in a signal is about 21 mm. The tilted gratings are formed to have a periodic interval of 0.76 μm, provided that the gratings diffract the incident optical beam 12 in a direction vertical to an optical axis, and then produce the emitted light 14. In case of a fiber Bragg reflector for optical communication, gratings are formed therein for practical use to have a periodic interval of about 0.5 μm. Therefore, the previously described gratings can be formed using a well-known technique for forming a fiber grating through interference generated, using a phase grating, between optical beams having a short wavelength, such as KrF excimer excitation light.

When the waveguide is a semiconductor with a refractive index of 3.5, the length that 8-bit in a signal occupies within the waveguide can further be shortened to 8.7 mm, and the tilted gratings can be formed to have a periodic interval of 0.3 μm, meaning that a desired waveguide can easily be fabricated by a lithography technique.

A detailed embodiment of the above-described optical packet header identifier and examples describing the embodiment in more detail will be disclosed below. In a first embodiment, the optical waveguide 10 depicted in the general diagram of the present invention shown in FIG. 2 comprises an optical fiber, and the optical focusing means 15 is realized by the following examples 1 through 6. Though not shown, the configurations of the examples all include the photo receiver 20.

Figure 3B:
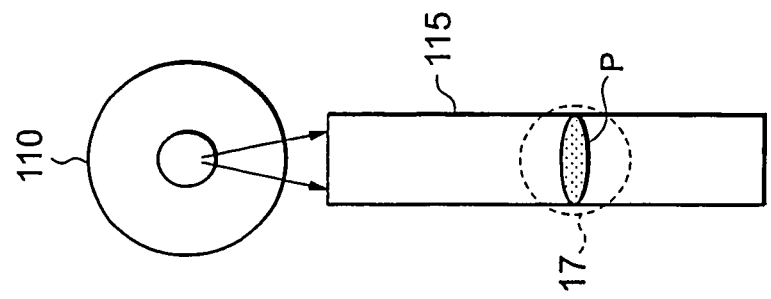
FIG. 3B is a side view thereof.
Figure 3A:
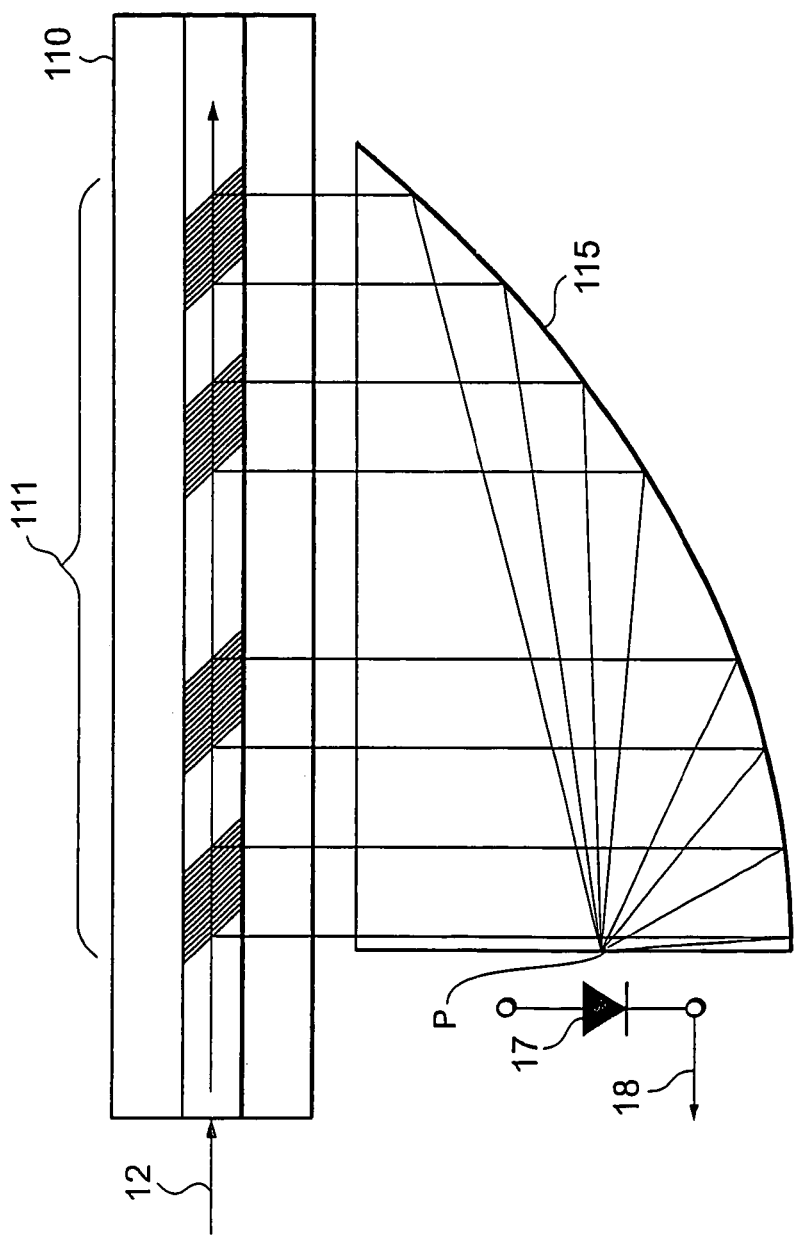

FIG. 3 illustrates a first example showing an optical packet header identifier comprising a single-mode optical fiber 110 for communication, a planar slab waveguide 115 having a reflecting plane, whose outline is parabolic, in a plane thereof and a photo receiver located at a focal point P on a parabolic curve, and FIG. 3A is a plan view of the identifier, and further, FIG. 3B is a side view thereof. In a core of the optical fiber 110, tilted gratings 111 are formed such that locations of the plurality of sets of tilted gratings along an optical axis are encoded.

When an incident optical beam 12 having an address added thereto through intensity modulation travels within the optical fiber, the beam is diffracted by the tilted gratings in a direction approximately vertical to the optical axis of the core. The diffracted optical beams are incident on the slab waveguide 115, and travel while being totally reflected by both the primary principal surfaces of the waveguide, and then, are focused onto a focal point "P" as is seen when using a parabolic antenna because a plane of the waveguide facing the incident plane thereof has a parabolic reflecting surface, and further the spatial integration of the focused optical beams is performed. Disposed at the focal point "P" is a photo receiver 17 for outputting a correlation signal as an electrical output signal 18 indicative of a correlation between the address code added to an optical signal and the spatially-encoded arrangement of the plurality of sets of tilted gratings by using ability of photo receiver to perform time integration and photoelectric conversion function thereof.

Thickness of the slab waveguide may be determined such that a diffracted optical beam leaving the core of the optical fiber and expanding in a direction vertical to the plane of this figure can entirely be captured by the slab waveguide when the beam reaches the end face of the slab waveguide. Since an optical beam is guided nearly exhibiting a Gaussian distribution within an optical fiber, the thickness T of the slab waveguide may be represented by relationship:

$T > 2W = 2\lambda z/(\pi w_0)$, where: "z" is a distance in air from the core to the linear side face of the slab waveguide; "2w" is a beam size (entire width) at the distance "z"; "$2w_0$" is a beam size (entire width) when the beam propagates in the single-mode optical fiber 110; and "λ" is a wavelength. When wavelength is 1.55 μm and the side face of the optical fiber and the linear side face of the slab waveguide contact one another, and further when taking into account the assumption that "$2w_0$" is about 6 μm in case of the single-mode fiber, the beam size "2w" at the end face of the slab waveguide on which optical beams are incident is about 30 μm, and accordingly the waveguide may need to have a thickness in the range from 30 to 50 μm.

Furthermore, a reflective coating material may be applied to the parabolic plane if necessary, or selecting a parabolic function of the parabolic plane also makes it possible for all of optical beams to totally be reflected on the parabolic plane.

Figure 4B:
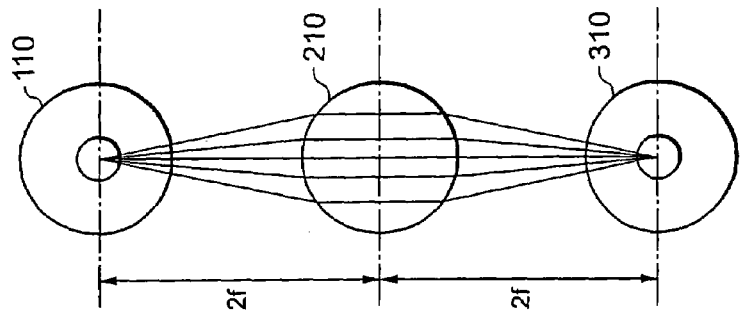
FIG. 4B is a side view thereof.
Figure 4A:
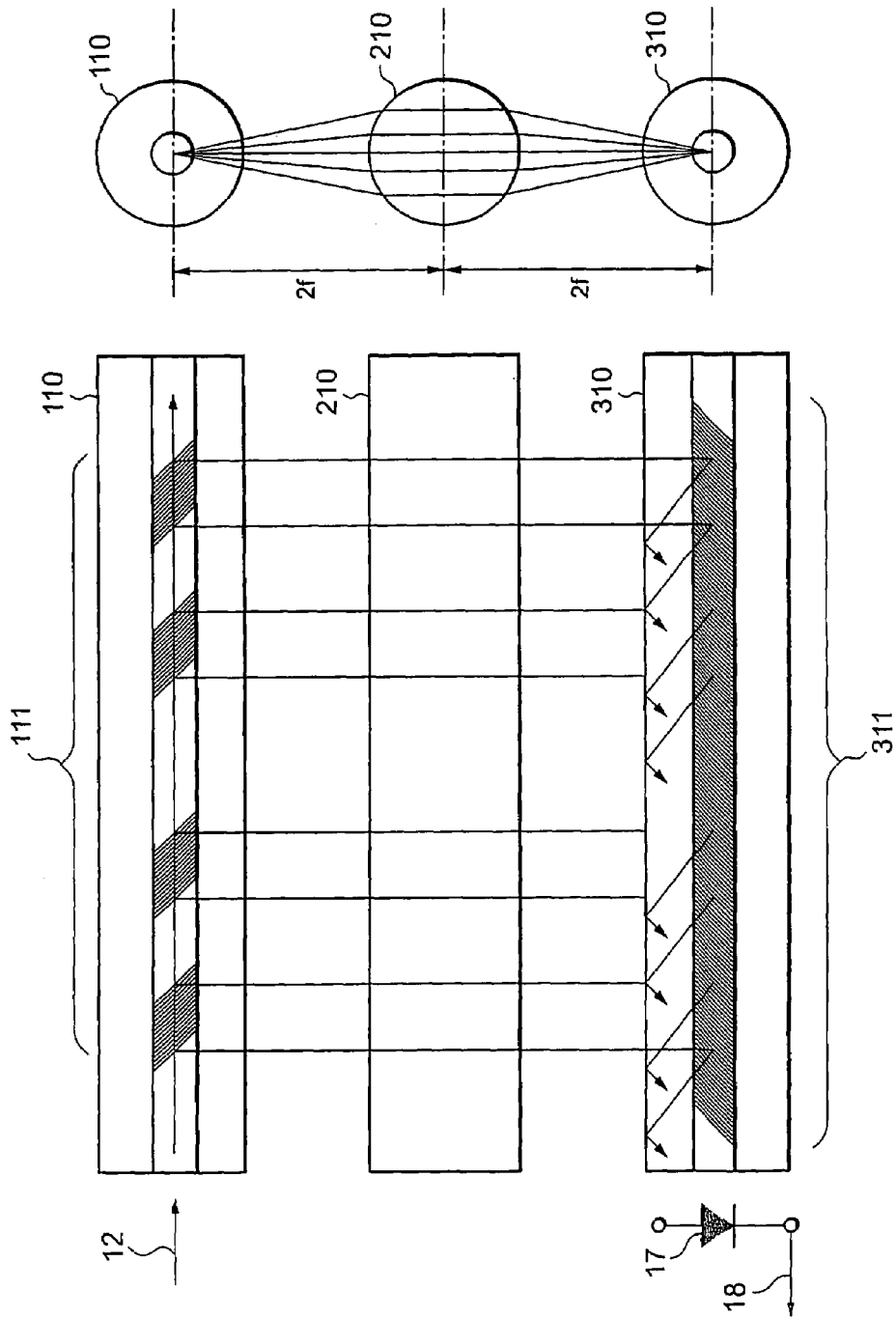

FIG. 4 illustrates a detailed second example of the optical packet header identifier according to the present invention. The identifier of the second example comprises a single-mode optical fiber 110 in which a plurality of sets of tilted gratings 111 are formed such that locations of the plurality of sets of tilted gratings are encoded along an optical axis, a multi-mode optical fiber 310 in which tilted gratings 311 are formed uniformly within the core of the fiber along an optical axis, a focusing optical fiber 210 serving as a cylindrical lens for focusing diffracted and emitted optical beams from the plurality of sets of tilted gratings 111 of the single-mode optical fiber 110 onto the core of the multi-mode optical fiber 310, and a photo receiver 17 located at the output end of the multi-mode optical fiber 310. FIG. 4A is a plan view of the identifier, and FIG. 4B is a side view thereof. It should be appreciated that the example employs the focusing optical fiber 210 and the multi-mode optical fiber 310 instead of the optical focusing means 15 shown in FIG. 2.

The tilted gratings 311 of the multi-mode optical fiber 310 are configured to make optical beams focused through and input from the focusing optical fiber 210 diffracted to travel in cladding mode within the multi-mode optical fiber 310. In more detail, the optical fibers 110 and 310 are made of the same material, and different only in the core diameter. The plurality of sets of tilted gratings 111, the locations of which are encoded within the fiber to correspond to an address code, and the tilted gratings 311 formed uniformly within the core of the fiber each have gratings formed at the same periodic intervals and tilted at angles slightly different from one another. The plurality of sets of tilted gratings 111 are configured to have gratings tilted at a specific angle relative to the optical axis of the core in order to diffract an optical beam guided along the fiber in a direction approximately vertical to the optical axis. The tilted gratings 311 uniformly formed along the core of the fiber 310 are configured to have gratings tilted at a specific angle relative to the optical axis of core in order to diffract optical beams incident vertically thereon not in parallel with the optical axis of core, but at an angle slightly distorted such that the optical beams travel in cladding mode within the optical fiber 310 after being diffracted. This is because when optical beams are diffracted in parallel with the optical axis of core, the beams are re-diffracted within the tilted gratings 311. In the optical fiber 310, the cross section of clad is far larger than that of the core, and therefore optical beams traveling in cladding mode within the fiber are less re-diffracted by gratings formed in the core. This allows optical beams traveling in cladding mode to propagate within the cladding of the optical fiber 310 without experiencing any transmission losses due to the uniformly formed gratings 311, and transfer their entire power to the photo receiver provided at the output end.

The focusing optical fiber 210 serving as a cylindrical lens is disposed such that the cores of the optical fibers 110 and 310 are positioned respectively at locations apart a distance in air two times focal length from the principal plane of the fiber 210, in order to couple optical beams in the same optical magnification. Focal length "f" of the cylindrical lens having a refractive index "n" and an entire circle of radius "r" is represented by the following equation.

$1/f = 2 \cdot (n-1)/r - 2 \cdot (n-1)^2/n \cdot r$

When the focusing optical fiber 210 is realized by employing a silica optical fiber that has a refractive index of 1.45 and a diameter "2r" of 125 μm, "f" becomes equal to 1.61 r and thereby, is 100.6 μm. Accordingly, the optical fibers 110, 310 and the focusing optical fiber 210 may be disposed such that spacing between centers of the cores of the optical fiber 110 and the focusing optical fiber 210, and spacing between centers of the cores of the optical fiber 310 and the focusing optical fiber 210 each become 201.2 μm in air.

Figure 5:
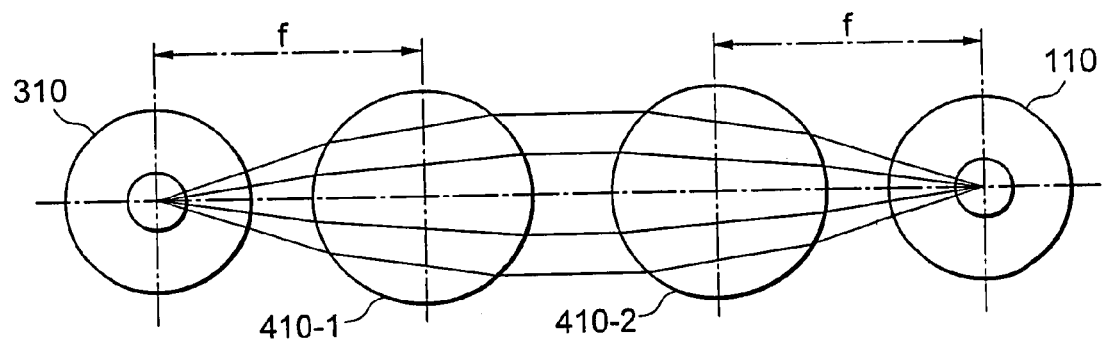
FIG. 5 is a diagram illustrating the configuration of a third example of the first embodiment of the optical packet header identifier according to the present invention.

In the above-described second example, although the focusing optical fiber 210 is optically disposed so that the beams emitted from the optical fiber 110 are focused onto the optical fiber 310 in the same optical magnification, optical fibers 410-1 and 410-2 may be employed as two cylindrical lens, as shown in a third example depicted in FIG. 5, in which emitted optical beams from the fiber 110 are once made to be collimated optical beams in a plane vertical to the paper by the first optical fiber, and then the collimated optical beams are focused through the second optical fiber, thereby constituting an optical infinite arrangement.

Figure 6:
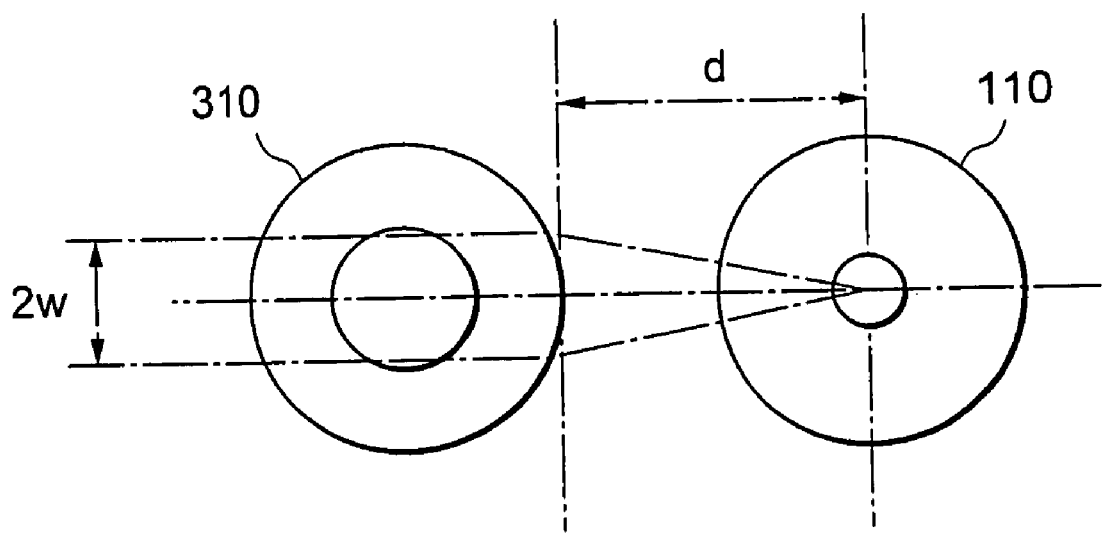
FIG. 6 is a diagram illustrating the configuration of a fourth example of the first embodiment of the optical packet header identifier according to the present invention.

Moreover, as shown in a fourth example depicted in FIG. 6, the identifier of the invention may be constructed such that the focusing optical fiber 210 is omitted and cylindrical faces of the optical fiber 110 for diffraction of light and the optical fiber 310 for reception of light are disposed near one another, and as a result, the slab waveguide of the first example having a parabolic reflecting end face is replaced by the optical fiber 310 for reception of light.

Location at which the optical fiber 310 for reception of light is to be disposed and core diameter that the optical fiber 310 for reception of light is to have for receiving all of diffracted optical beams from the optical fiber 110 will be calculated. The calculation can be performed by using a focusing formula applied to the case where optical beams are focused through one of side faces of the optical fiber 310 for reception of light. A distance "d" between center of the core of the optical fiber 110 for diffraction of light and cylindrical face of the optical fiber 310 for reception of light, which distance is determined such that diffracted optical beams from the optical fiber 110 for diffraction of light travel the distance "d" and after traveling through the curved face of the optical fiber 310 for reception of light, are collimated within the optical fiber 310 for reception of light, becomes about 140 μm in air. When making a distance between the two fibers larger than this value, the diffracted optical beams are focused within the optical fiber 310. When the distance "d" is determined so that the diffracted optical beams from the optical fiber 110 collimated within the optical fiber 310, a height 2w of the diffracted optical beams from the optical fiber 110 for diffraction of light becomes about 45 μm at the side face of the optical fiber 310, provided that the optical beams within the core of the optical fiber 110 for diffraction of light nearly are Gaussian beams having a diameter of $2w_0=6$ μm. Accordingly, the core of the optical fiber 310 for reception of light may have a diameter of about 50 μm.

An advantage of the example is that, even when bit rate of optical signal is low and/or length of address code becomes long, the element never becomes longitudinally large in size. For example, when the bit rate of signal is 1 Gbps and the address code has 32 bits in length, the optical fibers 110, 310 disposed near one another should have a long length of 3.2 m. However, the optical fibers 110, 310 having such long length can be mounted in a small space by winding the two fibers in the form of a coil or reel.

Furthermore, the above-described bit rate of signal corresponds to the bit rate used in LAN such as Ethernet (registered trademark) or an access system. This means that the present invention can effectively be used even at a bit rate of signal at which a terminal located at the termination of network operates.

Figure 7B:
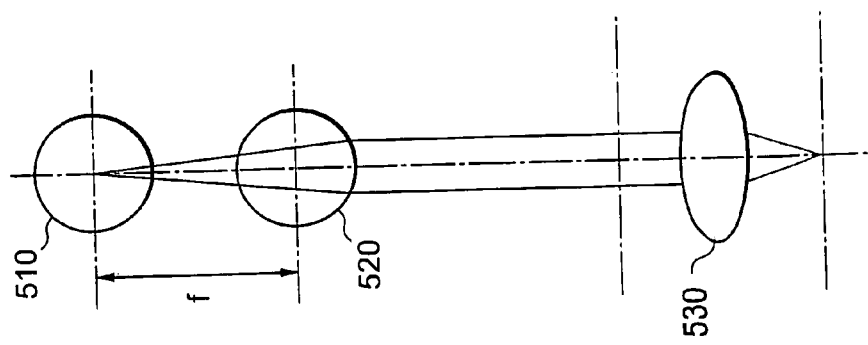
FIG. 7B is a side view thereof.
Figure 7A:
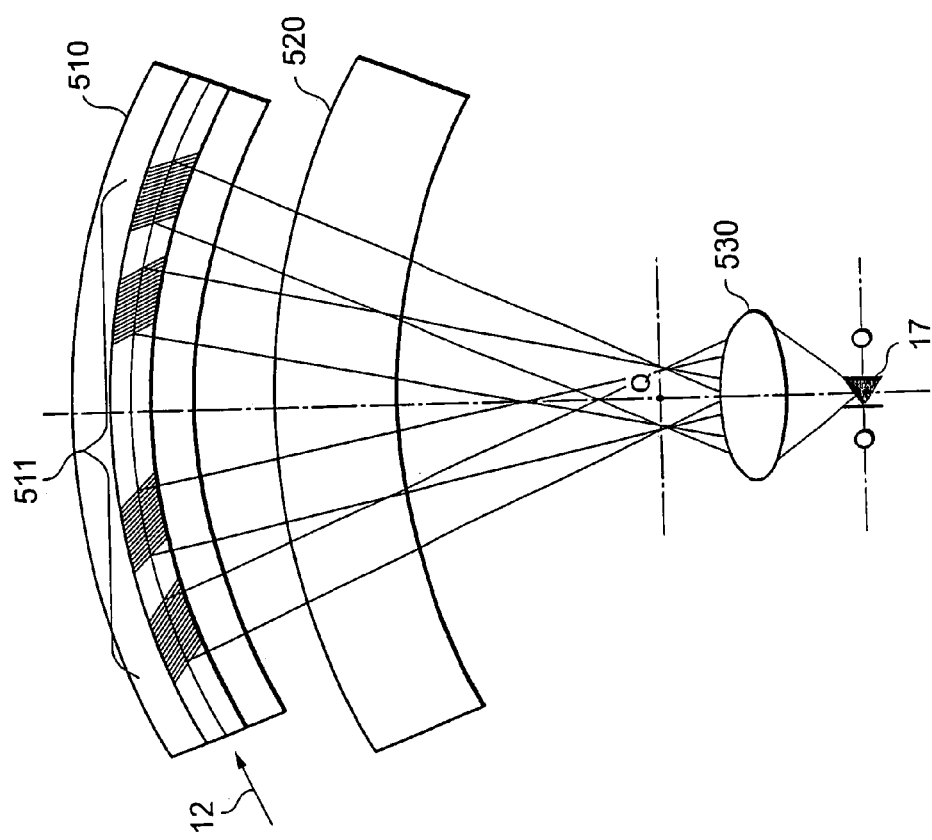

A fifth example is illustrated in FIG. 7. FIG. 7A is a plan view and FIG. 7B is a cross sectional view taken along a central line of the plan view.

The optical packet header identifier of the example comprises an optical waveguide 510 having a circular optical axis, a cylindrical lens 520 depicted as a circular arc in the same plane as the optical waveguide 510, a normal focusing lens 530 having axisymmetric focusing power, and a photo receiver 17. It should be appreciated that the example employs the cylindrical lens 520 and the focusing lens 530 instead of the focusing means 15 shown in FIG. 2.

The optical waveguide 510 has a plurality of sets of tilted gratings 511 provided in a core thereof such that the locations of the plurality of sets of tilted gratings 511 are encoded along the optical axis within the waveguide. Each set of tilted gratings 511 are tilted at an angle such that a central axis of diffracted optical beams emitted from the each set of tilted gratings passes through a point Q shown in the plan view of FIG. 7A. As shown in FIG. 7B, which is the cross section cut by a plane vertical to the paper, the cylindrical lens 520 is disposed to have its focal point at the center of the core of the optical waveguide 510 in order to collimate optical beams emitted from the tilted gratings and expanding therefrom, within the cylindrical lens 520. Furthermore, the cylindrical lens 520 is depicted as a circular arc centering the point "Q" so as not to cause optical aberration in the collimated optical beams emitted from each of the plurality of sets of tilted gratings 511. The focusing lens 530 having axisymmetric focusing power focuses an image formed at the point "Q" onto the photo receiver 17.

A sixth example is illustrated in FIG. 8. FIG. 8A is a plan view and FIG. 8B is a cross sectional view taken along a central line of the plan view.

The optical packet header identifier of the example comprises a linear-shaped optical waveguide 110, a focusing lens 630 having different lens characteristics in a horizontal plane and a plane vertical to the horizontal plane, and a photo receiver 17. The example employs only the focusing lens 630 instead of the focusing means 15 shown in FIG. 1.

The optical waveguide 110 has a plurality of sets of tilted gratings 611 provided in a core thereof so that the locations of the plurality of sets of tilted gratings are encoded along the optical axis within the waveguide. Each of the plurality of sets of tilted gratings 511 are tilted at an angle such that a distance "t" from a central position "R" of the optical axis of optical fiber to a central position of each of the plurality of sets of tilted gratings in a longitudinal direction and an angle "θ" at which an optical beam incident on the waveguide is diffracted by the corresponding set of tilted gratings satisfy the relationship represented by t=fθ. In this case, "f" represents a focal length within a horizontal plane of the focusing lens 630.

The focusing lens 630 acts as a "fθ" lens within the horizontal plane and as a cylindrical lens to focus optical beams emitted and expanding from the plurality of sets of tilted gratings 611 within the core of the optical waveguide 110, onto the photo receiver 17 within the vertical plane. A lens performing different lens operations in planes orthogonal to one another can be realized by, for example, employing a composite lens composed of an "fθ" lens and a cylindrical lens, a hologram lens, an aspherical lens, etc. Furthermore, instead of lens, an aspherical mirror may be employed.

Although in the embodiments described so far, as the optical fibers 110, 510 each have a plurality of sets of tilted gratings provided therein so that the locations of the plurality set of tilted gratings are encoded, a single-mode optical fibers for communication are employed, but the embodiments need not to be limited to employment of single-mode optical fiber, but may employ a multi-mode optical fiber.

Moreover, material of fiber employed in the invention is not limited to a silica, but may be a glass or plastic. Additionally, the core employed in the invention is not limited to a circular core, but may be a rectangular core or a channel optical waveguide formed on a planar substrate.

In addition, the focusing means employed in the invention is not limited to an optical fiber and a planar waveguide, and further, material of the focusing means is not limited to a glass and plastic.

To make a correlation signal output from the photo receiver 17 shown in FIG. 2 output a clear correlation peak that has a symmetrical waveform and exhibits no deformation of waveform in the time domain, intensities of diffracted optical beams from all the tilted gratings 11 need to be uniform. When the intensities of diffracted optical beams along the optical axis of the optical waveguide 10 are significantly differed, the waveform of correlation signal deforms and then a peak indicative of clear correlation may not appear. When diffraction efficiency of the plurality of sets of tilted gratings is low, the amount of optical power attenuated in proportion to a distance that the incident optical beam 12 propagates along the optical axis of the optical waveguide 10 is small, and diffracted optical beams from any one of the plurality of sets of tilted gratings are output, having approximately equal intensity.

In the event the above-described diffraction efficiency is made relatively high to increase the quantity of light to be received by the photo receiver 17, the previously mentioned fault will occur. If the diffraction efficiency is made different depending on the locations of the plurality of sets of tilted gratings, the fault can be avoided. In more detail, a desired optical waveguide is constructed such that diffraction efficiency of sets of tilted gratings located near the input end of the waveguide for an incoming optical beam is made low and diffraction efficiency of sets of tilted gratings located near the output end thereof for an outgoing optical beam is made high, thereby allowing intensity of diffracted optical beams from any one of the plurality of sets of tilted gratings to substantially be the same. The above-described desired optical waveguide can be realized by controlling intensity of ultraviolet ray (UV ray) to be irradiated, the number of pulses in UV ray, and/or time period over which UV ray is being irradiated, at the time of formation of fiber grating.

Furthermore, in the second to fourth examples, each employing as an optical focusing member an optical fiber for reception of light in which gratings are formed, the optical fiber 310 for reception of light may be made to have weighed diffraction efficiency along the optical axis, or the optical waveguide may be made together with the optical fiber 310.

A second embodiment of the optical packet header identifier according to the present invention will be explained below. Based on the concept shown in FIG. 2, the second embodiment employs a semiconductor optical waveguide as the optical waveguide 10, and realizes gratings by forming in the semiconductor optical waveguide spatial periodicity of refractive index variation, which periodicity is generated so that refractive index within the waveguide is lowered by performing spatial periodic current injection (carrier injection) into the waveguide so that the injection acts through a band-filling effect on a guided optical beam. The band-filling effect means a phenomenon in which empty energy levels within an energy band are filled by injecting of free carriers to shift wavelength at absorbance edge substantially to the side of short-wavelength, thereby lowering refractive index of semiconductor, as is known to those skilled in the art. The lowering of refractive index is independent on polarized wave. Focusing means and two photo receivers of the embodiment are configured to have the configuration similar to that of the first embodiment.

Figure 9:
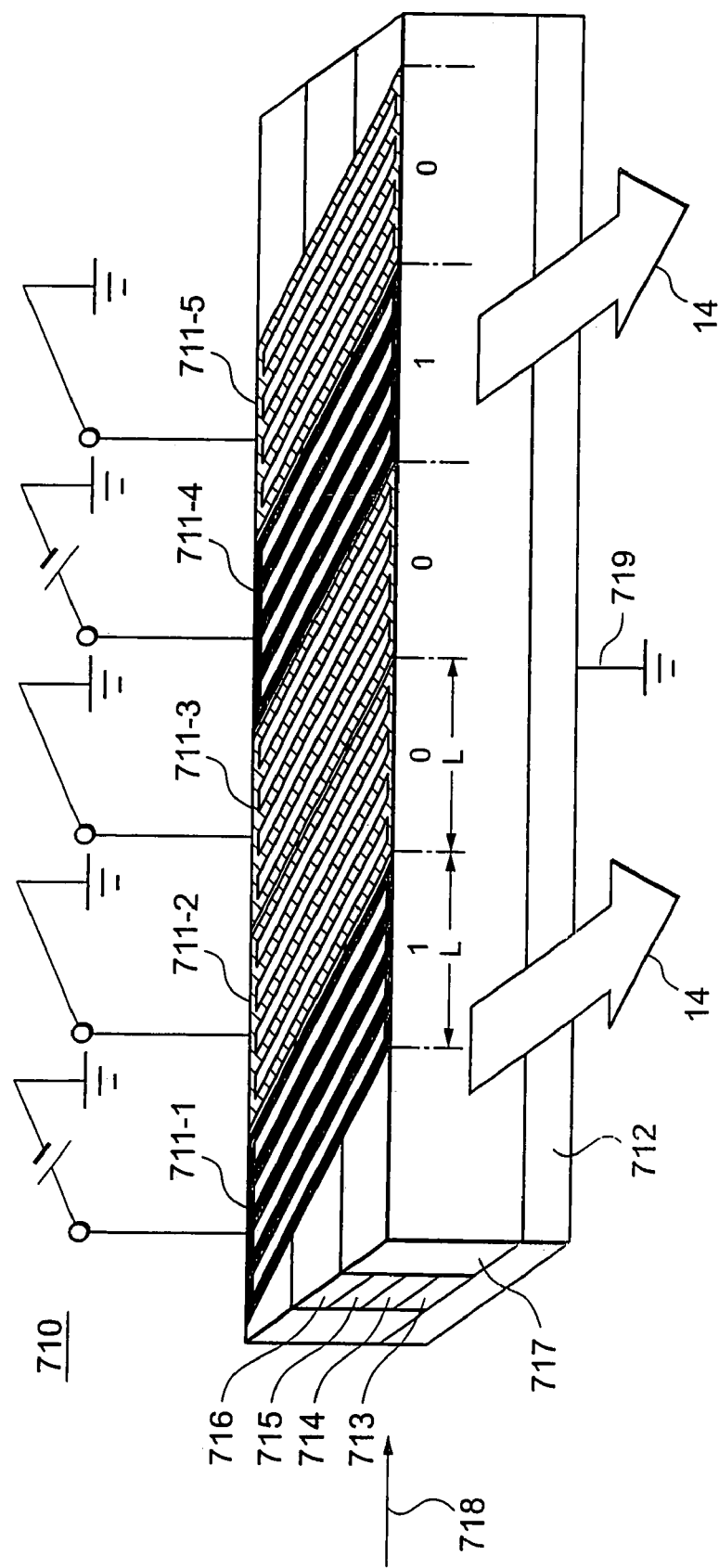
FIG. 9 is a diagram illustrating the configuration of a second embodiment of an optical packet header identifier according to the present invention.

FIG. 9 illustrates an optical waveguide which is constructed such that buried-channel optical waveguide of "p-i-n" structure is formed through etching and growth of crystalline on a transparent semiconductor substrate and a plurality of sets of electrodes are disposed thereon in the form of duckboard, and forward current is injected between selected set of electrodes and a ground electrode located on a back face of the substrate. Formed within channel waveguide below selected duckboard-shaped set of electrodes are periodic refractive index gratings through the above-described band-filling effect. The periodic refractive index gratings are not formed below unselected set of electrodes. The concept of the present invention shown in FIG. 2 is realized by selecting sets of electrodes to be conducted current so that the selected sets of electrodes corresponds to an address code. This indicates that the second embodiment has a significant advantage over the first embodiment in that although a code produced by corresponding sets of tilted gratings is fixed in the first embodiment, a code produced by the same is programmable in the second embodiment.

A semiconductor optical waveguide 710 having programmable chirp gratings therein is formed such that an n-type cladding layer 713, an i-layer 714 as a core, a p-type cladding layer 715 and a p-type contact layer 716 on a n-type semiconductor substrate are laminated through crystal growth technique in a planar form and both sides of the laminated layers are etched to expose the substrate so that the remaining laminated layers become a channel waveguide, and the channel waveguide is buried in the optical waveguide by filling both sides of the channel waveguide with an insulative component 717 having a low carrier concentration. Thereafter, a plurality of sets of duckboard-shaped electrodes 711-1 to 711-5 are formed on the waveguide, and a ground electrode 719 is formed over the back face of the substrate. Two sets of duckboard-shaped electrodes adjacent to one another are electrically isolated from one another. Spacing between grids formed within each of the plurality of sets of duckboard-shaped electrodes and an angle at which a guided optical beam propagates relative to an optical axis are determined such that refractive index gratings formed within the optical waveguide by conducting current between a set of electrodes and the back face electrode 719 diffract an incident optical beam 718 in a direction approximately orthogonal to the waveguide to produce diffracted optical beams 14.

Length "L" of one set of duckboard-shaped electrodes along the optical axis is determined to be equal to the length that 1-bit of a signal in the incident optical beam 718 within the semiconductor crystalline. Sets of electrodes to be conducted current are selected based on an address code in the header portion of an optical signal to be detected. In FIG. 9, the address code is represented by a 5-bit code including the binary sequence "10010", and the sets of electrodes 711-1 and 711-4 are selected correspondingly. That is, refractive index gratings are formed only below the two sets of electrodes 711-1 and 711-4 through a band-filling effect.

By combining the semiconductor optical waveguide 710, the optical focusing member 15 having detailed configuration shown in the above-described examples 1 through 7, and the photo-receiver 17 together, only when an incoming optical packet 718 has a header code, including the binary sequence "10010," added thereto, the correlation signal shown in FIG. 2 is output from the photo receiver 17. As is described above, since the second embodiment has ability to optionally select sets (or a set) of electrodes to be conducted current, a header code to be identified can optionally be determined, whereby a programmable optical packet header identifier can be constructed.

Additionally, adjusting the amount of current to be supplied to corresponding sets of electrodes easily allows intensity of diffracted optical beams to be uniform along an optical axis.

It should be appreciated that an optical semiconductor material to be employed can be realized by selecting a most effective material, such as Si series, InP series, GaAs series and AIN series, depending on the wavelength of an optical signal to be used.

An embodiment of an optical network incorporating therein the optical packet header identifier of the present invention will be disclosed below.

Figure 10:
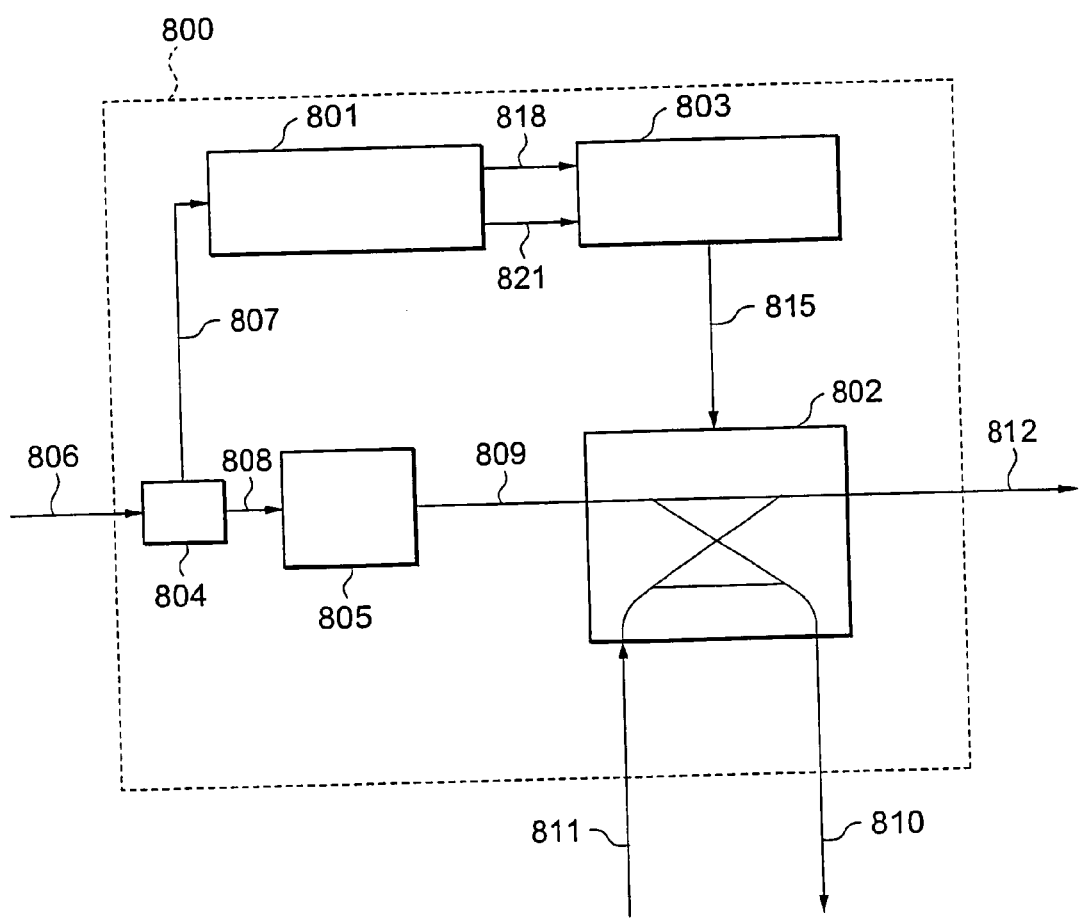
FIG. 10 is a diagram illustrating the configuration of a first embodiment of an optical network node having the optical packet header identifier of the present invention applied thereto.

FIG. 10 is a diagram illustrating the configuration of an Optical Add/Drop Multiplexer (OADM) that incorporates therein the optical packet header identifier of the present invention. An OADM 800 comprises an optical packet header identifier 801 of the present invention, a 2×2 optical switch circuit 802, an optical switch control circuit 803, an optical branch 804, and an optical delay circuit 805.

An incident optical signal 806 coupling a number of packets together and input to the OADM 800 is branched into two signals by the optical branch 804, and then one of the two signals is input to the optical packet header identifier 801, whether the other is delayed by the optical delay circuit 805, thereby being input to the 2×2 optical switch circuit 802. The optical packet header identifier 801 calculates correlation between an address code previously given to the identifier and an optical packet input to the identifier, and then outputs a correlation signal 818 having the waveform 19 shown in FIG. 2 and a signal 821 produced by converting an optical packet signal which transmits through the optical waveguide 11 shown in FIG. 2 to an electrical signal.

The optical switch control circuit 803 detects a head of an optical packet train from the photoelectrically converted packet signal 821. Locations in the time domain at which the headers of individual packets are located are identified based on the time when the head of the packet train has been detected, time windows are periodically created, and then the correlation signal 818 is captured at individual times corresponding to the time windows. Upon detection of the correlation signals, in order to separate all the packets, whose correlation signals were detected, from the packet train input to the identifier, the optical switch control circuit 803 outputs a control signal 815 to the 2×2 optical switch circuit 802, so that the 2×2 optical switch circuit 802, which is normally in a pass-through switch state, is delayed by the time delay by which the corresponding packets are delayed by the optical delay circuit 805, and changes its state, and then stays in a cross switch state for the duration of the corresponding packet. This allows only the packets, which are to be separated through the OADM 800 at this node and from an optical packet train 809 passing through the optical delay circuit 805, to be output to a separation output 810, and the remainder of the packet train is output to a transmission output line 812 after passing through the OADM because the 2×2 optical switch circuit 802 is in a pass-through switch state. When another packet is inserted through this node into an empty time slot, in which the corresponding separated packet was located, a packet to be inserted is input from an input port 811, creates a new optical packet train along with other packets, which were input through the input 806 and not separated at this node, and finally, is output to the transmission output line 812.

In the case where the separation output 810 does not terminate at this node, but is transmitted to a transmission output line different from the transmission output line 812, the node 800 comes to operate as a router.

The 2×2 optical switch circuit 802 that operates at high rate may be a waveguide optical switch that uses lithium niobate crystalline having a ferroelectric crystalline. In addition, the optical delay circuit 805 may be an optical fiber delay line.

Figure 11:
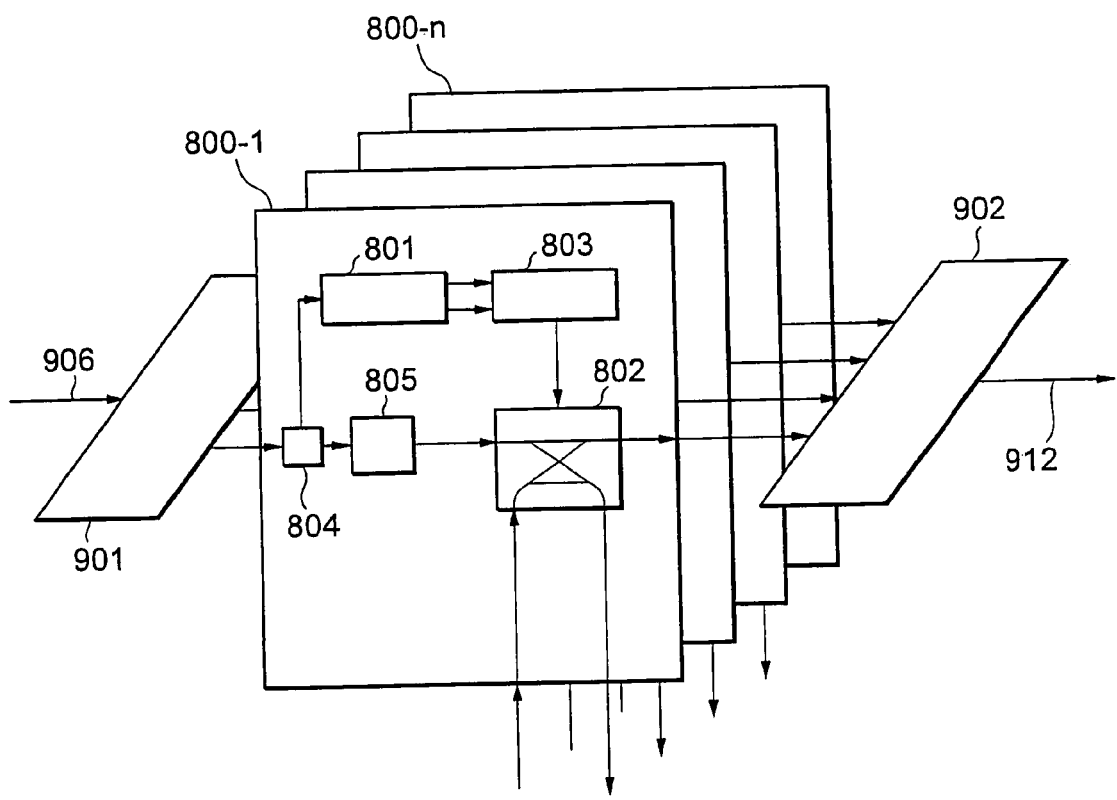
FIG. 11 is a diagram illustrating the configuration of a second embodiment of the optical network node having the optical packet header identifier of the present invention applied thereto.

FIG. 11 illustrates an embodiment in which an Optical Add/Drop Multiplexer (OADM) node in a Wavelength-Division Multiplexing (WDM) transmission system is constructed by employing the optical packet header identifier of the present invention.

A WDM-OADM comprises a demultiplexer 901 for demultiplexing wavelength division multiplexed (WDM) optical signals input from a primary transmission line 906, a plurality of OADMs 800-1 to 800-n which are provided such that n pieces of the OADMs shown in FIG. 9 are arranged in parallel with one another so as to correspond to individual wavelengths, and a multiplexer 902 for multiplexing optical signals passing through the OADMs and a packet newly inserted at this node to create a new packet train, and for transmitting the new packet train to a primary transmission line on the side of output. How an OADM operates is the same as that explained in the description of FIG. 10.

In the embodiment, in order for the WDM-OADM to be able to securely multiplex and demultiplex optical signals even when optical signals having different wavelengths are not in synchronization with one another in the time domain, the OADMs corresponding to individual wavelengths each include the optical packet header identifier of the present invention.

The optical packet header identifier 801 is configured to detect one address code in the above-stated explanation. However, in order for the optical packet header identifier to be able to detect different multiple address codes, the optical waveguide 10 constituting the optical packet header identifier may be configured to have a plurality of waveguides connected in series, so that each of the plurality of waveguides contains a plurality of sets of tilted gratings, the locations of which are encoded in accordance with a code different from other codes.

Furthermore, in the case where a separation output from each of the OADMs 800-1 to 800-n does not terminate at this node, but is transmitted to a transmission output line different from the transmission output line 912 after being multiplexed, the node 800 comes to operate as a router.

Figure 12:
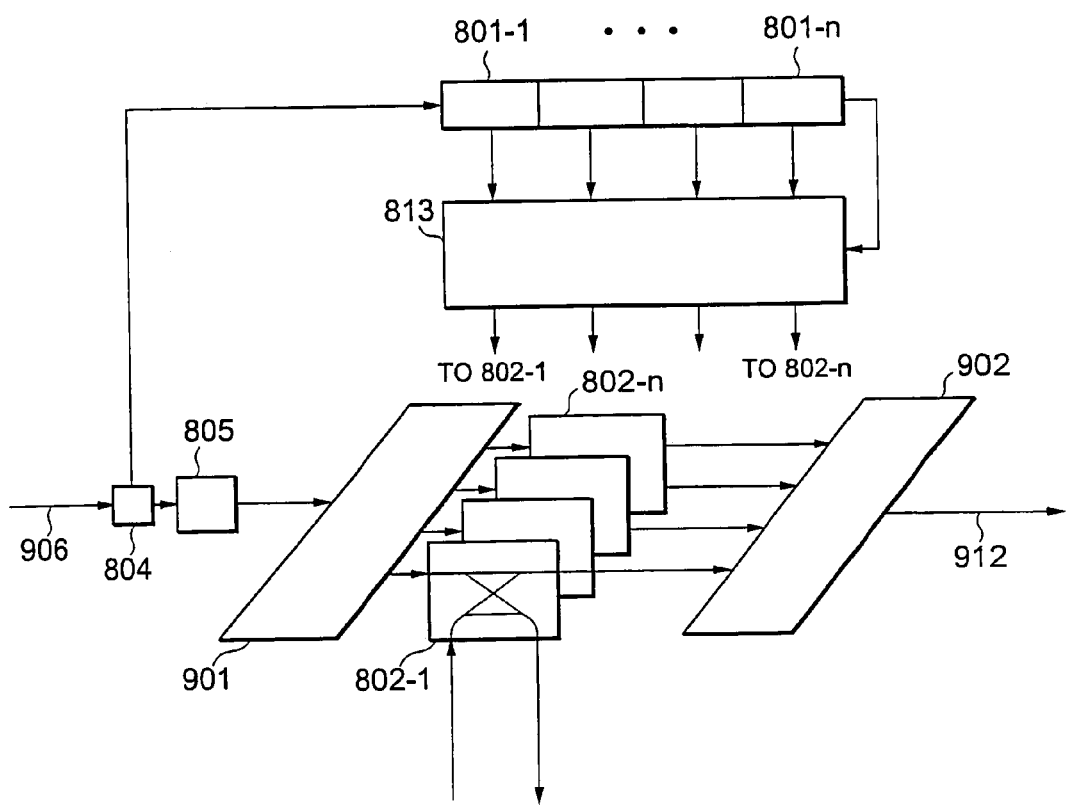
FIG. 12 is a diagram illustrating the configuration of a third embodiment of the optical network node having the optical packet header identifier of the present invention applied thereto.

FIG. 12 illustrates the configuration of WDM-OADM in which wavelength-multiplexed optical packet trains are in synchronization with one another in the time domain, and packet length of each of packets that constitute a packet train is the same. In this case, individual OADMs corresponding to individual wavelengths need not to have the optical packet header identifier provided therein, but can share one optical packet header identifier.

The WDM-OADM of the embodiment comprises an optical branch 804 for branching all together optical signals inserted into and transmitted through the primary optical transmission line 906, and corresponding to a number of wavelengths, an optical packet header identifier 801 to which one of the branched optical beams is input, and further which is constructed by coupling in series optical packet header identifiers corresponding to different wavelengths, an optical delay circuit 805 by which the other of the branched optical beams is delayed, an optical demultiplexer 901 for demultiplexing wavelength division multiplexed optical signals passing through the optical delay circuit 805, a 2×2 optical switch circuit 802 to which each of demultiplexed optical signals corresponding to individual wavelengths is input, an optical multiplexer 902 for multiplexing discrete wavelength optical beams output from the 2×2 optical switch circuit 802, and transmitting the multiplexed beams to a primary transmission output line 912, and an optical switch control circuit 813.

Optical packet header identifiers 801-1 to 801-*n* are constructed such that the optical waveguide 10 shown in FIG. 2 constitutes a plurality of optical waveguides, which are coupled in series along an optical axis and each of the plurality of optical waveguides has a plurality of sets of tilted gratings arranged therein, encoded to correspond to an associated code, and corresponding to a wavelength different from the remaining wavelengths, and in addition, are provided means for focusing and receiving individual diffracted optical beams corresponding to different wavelengths. The photo receiver 20 shown in FIG. 2 is singly employed in the embodiment for receiving a packet train that contains optical beams corresponding to a plurality of wavelengths and packets provided in the same format and being in synchronization with one another. Although operation of the WDM-OADM of the embodiment is similar to that explained in the description of the embodiment shown in FIG. 10, the optical switch control circuit 813 transmits a control signal for opening/closing switch to a plurality of 2×2 optical switch circuits 802-1 to 802-*n*.

The embodiment also detects a plurality of address codes using one wavelength, and then separates corresponding packets (or a corresponding packet). This operation is similar to that explained in the description of the embodiment shown in FIG. 11.

Furthermore, in the case where a separation output from each of the 2×2 optical switch circuits 802-1 to 802-*n* does not terminate at this node, but is transmitted to a transmission output line different from the transmission output line 912 after being multiplexed, the node 800 comes to operate as a router.

As described so far, although an optical ADM has been described as an example of an optical network node that employs the optical packet header identifier of the present invention, instead of optical ADM, an Optical Cross Connect (OXC) may be also employed. The special packet header identifier of the present invention can be used in a system for routing optical packets over a wide area while maintaining the packets in the form of light.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical router for switching between paths for a specific optical packet out of an optical signal consisting of an optical packet train having a plurality of optical packets coupled together, said optical router comprising:
    an optical branch for branching said optical packet train input from an optical transmission input line;
    an optical packet header identifier for receiving one of optical outputs from said optical branch; said optical packet header comprising:
        an optical waveguide, a tilted grating for diffracting an optical beam propagating within a core of said optical waveguide toward an outside of said optical waveguide, a set of tilted gratings constituted by said tilted grating and having a thickness of gratings approximately equal to a length occupied in a direction along an optical axis within said optical waveguide by one bit of a signal of an optical packet, and said plurality of sets of tilted gratings are encoded and arranged in a direction along an optical axis based on a specific header code for said optical packet;
        optical beam focusing means for spatially focusing optical beams diffracted by all of the sets of tilted gratings;
        a first photo receiver for receiving said focused optical beams; and
        a second photo receiver for receiving an optical beam propagating though said optical waveguide at an output end of said optical waveguide
    an optical delay device for making the other of optical outputs from said optical branch delay by a predetermined time delay;
    an optical switch for outputting at least one optical packet having a header identified by said optical packet header identifier, said optical packet being separated from said optical packet train output from said optical delay device, to a first optical transmission output line, and outputting optical packets excluding said at least one optical packet identified by said optical packet header identifier to a second optical transmission output line, based on an output from said optical packet header identifier.

2. An optical router for switching between paths for a specific optical packet, corresponding to one of individual wavelengths, out of a plurality of optical packets coupled together and constituting an optical packet train as an wavelength-division-multiplexed optical signal, said optical router comprising:
    a demultiplexer for demultiplexing said wavelength-division-multiplexed optical signal input from an optical transmission input line;
    a plurality of said optical routers defined in claim 1 for receiving a plurality of optical outputs having wavelengths different from one another from said demultiplexer, respectively; and
    a multiplexer for multiplexing optical outputs from said second optical transmission line of said plurality of said optical routers.

3. An optical routing method using said optical router defined in claim 1, comprising steps of:
    detecting a head of said optical packet train based on an output from said second photo receiver of said optical packet header identifier;
    calculating, in the time domain, locations of headers of optical packets constituting an optical packet train based on the time when said head of said optical packet train is detected;
    detecting an output from said first photo receiver of said optical packet header identifier at individual times corresponding to said locations; and
    making a corresponding optical packet delay by a time period in order to separate said corresponding optical packet from said optical packet train input to said optical router, said time period being equal to a time delay by which said optical packet train is made to delay by said optical delay circuit, and transmitting to said optical switch a control signal so that said optical switch changes its switch state for a duration of said corresponding optical packet, in the event the detected output from said first photo receiver is higher than a predetermined level.

4. An optical router having function of Optical Add/Drop Multiplexer (OADM) for switching between paths for a specific optical packet out of a plurality of optical packets coupled together and constituting an optical packet train as an optical signal and inserting an optical packet different from said specific optical packet into a location of said specific optical packet, said location becoming empty by switching between paths, said optical router comprising:

an optical branch for branching said optical packet train input from a first optical transmission input line;

an optical packet header identifier for receiving one of optical outputs from said optical branch; said optical packet header comprising:

an optical waveguide, a tilted grating for diffracting an optical beam propagating within a core of said optical waveguide toward an outside of said optical waveguide, a set of tilted gratings constituted by said tilted grating and having a thickness of gratings approximately equal to a length occupied in a direction along an optical axis within said optical waveguide by one bit of a signal of an optical packet, and said plurality of sets of tilted gratings are encoded and arranged in a direction along an optical axis based on a specific header code for said optical packet;

optical beam focusing means for spatially focusing optical beams diffracted by all of the sets of tilted gratings;

a first photo receiver for receiving said focused optical beams; and a second photo receiver for receiving an optical beam propagating though said optical waveguide at an output end of said optical waveguide an optical delay device for making the other of optical outputs from said optical branch delay by a predetermined time delay; and an optical switch for outputting at least one optical packet having a header identified by said optical packet header identifier, said optical packet being separated from said optical packet train output from said optical delay device, to a first optical transmission output line, and outputting optical packets excluding said at least one optical packet identified by said optical packet header identifier to a second optical transmission output line, and inserting an optical packet from a second optical transmission input line into a location of said at least one optical packet identified by said optical packet header identifier, based on an output from said optical packet header identifier.

5. An optical router having function of Optical Add/Drop Multiplexer (OADM) for switching between paths for a specific optical packet, corresponding to one of individual wavelengths, out of a plurality of optical packets coupled together and constituting an optical packet train as an wavelength-division-multiplexed optical signal, and inserting an optical packet different from said specific optical packet into a location of said specific optical packet, said location becoming empty by switching between paths, said optical router comprising:

a demultiplexer for demultiplexing said wavelength-division-multiplexed optical signal input from an optical transmission input line;

a plurality of said optical routers defined in claim 3 for receiving a plurality of optical outputs having wavelengths different from one another from said demultiplexer, respectively; and a multiplexer for multiplexing optical outputs from said second optical transmission output line of said plurality of said optical routers.

\* \* \* \* \*